(12) United States Patent  (10) Patent No.: US 8,466,641 B2
Kaufmann et al.  (45) Date of Patent: Jun. 18, 2013

(54) POWER TOOL HAVING AN ELECTRIC BRAKE

(75) Inventors: Michael Kaufmann, Ellwangen (DE); Ulf Rinckleb, Unterschneidheim (DE)

(73) Assignee: C. & E. Fein GmbH (DE)

( * ) Notice: Subject to any disclaimer, the term of this patent is extended or adjusted under 35 U.S.C. 154(b) by 66 days.

(21) Appl. No.: 13/187,096

(22) Filed: Jul. 20, 2011

(65) Prior Publication Data

US 2012/0019177 A1 Jan. 26, 2012

(30) Foreign Application Priority Data

Jul. 20, 2010 (DE) .......................... 10 2010 032 335

(51) Int. Cl.
*H02P 3/12* (2006.01)
*H02P 3/10* (2006.01)

(52) U.S. Cl.
USPC ...... 318/379; 318/362; 318/400.34; 318/375; 388/937; 700/275; 173/176

(58) Field of Classification Search
USPC ............. 318/379, 375, 400.34, 362; 388/935, 388/937; 700/275; 173/176
See application file for complete search history.

(56) References Cited

U.S. PATENT DOCUMENTS

| | | | | |
|---|---|---|---|---|
| 4,354,147 A * | 10/1982 | Klaussner | ..................... | 318/363 |
| 4,553,074 A * | 11/1985 | Jacquemet | ..................... | 318/130 |
| 6,236,177 B1 * | 5/2001 | Zick et al. | ..................... | 318/362 |
| 6,680,598 B2 * | 1/2004 | Galbiati et al. | ............... | 318/717 |
| 6,831,432 B2 * | 12/2004 | Murakami | ..................... | 318/362 |
| 7,023,159 B2 * | 4/2006 | Gorti et al. | ..................... | 318/432 |
| 7,071,645 B2 * | 7/2006 | Hahn et al. | ..................... | 318/379 |
| 7,075,257 B2 * | 7/2006 | Carrier et al. | .................. | 318/375 |
| 2002/0081106 A1 * | 6/2002 | Galbiati et al. | ............... | 388/800 |
| 2003/0102833 A1 * | 6/2003 | Murakami | ..................... | 318/362 |
| 2004/0207351 A1 * | 10/2004 | Hahn et al. | ..................... | 318/379 |
| 2005/0052145 A1 * | 3/2005 | Carrier et al. | .................. | 318/381 |
| 2005/0120492 A1 * | 6/2005 | Koo et al. | ........................ | 8/159 |
| 2005/0140320 A1 * | 6/2005 | Hidaka | ......................... | 318/379 |

FOREIGN PATENT DOCUMENTS

DE 102008033866 A1 1/2010

* cited by examiner

*Primary Examiner* — Paul Ip (74) *Attorney, Agent, or Firm* — St. Onge Steward Johnston & Reens LLC (57) ABSTRACT

The invention relates to a method for decelerating a drive movement of a power tool and to a power tool suitable for carrying out the method, having a drive driven by a motor, an energy supply device for the provision of electrical energy, a controller having a motor controller for activating the motor and an operating-state recognition module which is to detect at least one operating-state variable and, as a function of this, to output a brake signal, the controller being designed to initiate, as a function of the brake signal, a braking procedure in which brake cycles are provided which have a first time segment, in which the motor is short-circuited, and a second time segment in which current is fed to the motor opposite to its original direction of rotation.

20 Claims, 6 Drawing Sheets

POWER TOOL HAVING AN ELECTRIC BRAKE

CROSS-REFERENCES TO RELATED APPLICATIONS

This invention claims Convention Priority of German patent application Serial No. 10 2010 032 335.7 filed on Jul. 20, 2010, the entire contents of which is full incorporated herein by reference.

BACKGROUND OF THE INVENTION

The invention relates to a power tool comprising a motor which is couplable to a drive, an energy supply device for the provision of electric energy, a controller having a motor controller for activating the motor, and further comprising an operating-state recognition module which is configured to detect at least one operating-state variable and, as a function of this, to output a brake signal.

The subject of the invention is, furthermore, a method for decelerating a drive movement of a power tool.

A power tool of this type is known from DE 10 2008 033 866 A1.

The known power tool is a machine tool with a controller having a limitation device for limiting an output torque provided on the drive side. The controller is designed for activating, as a function of at least one brake condition, a current feed device in a brake operating mode in which a motor from the machine tool is braked by means of a contradirectional rotating field.

Power tools with electric motors are employed in many fields of use. Thus, inter alia, many diverse appliances and machines are known for drilling, screwing, percussion drilling, sawing, cutting, grinding or polishing.

Conventionally, the power tools have a drive train with an electric motor, a tool-holding fixture, drivable by the motor, for receiving a tool, and also, if required, an interposed transmission device. The motors used are, in the case of high-performance power tools, heavy-duty motors with a low power/weight ratio or high power density. Motors of this type have, for example, nominal rotational speeds of approximately 10 000 min$^{-1}$ to 30 000 min$^{-1}$.

With regard to the transmission device and to a tool which may possibly have a high moment of inertia, during operation at high rotational speeds states may arise in which the drive train of the power tool has high kinetic energy. In specific operating states, it is desirable to reduce this energy as quickly as possible so that as rapid a tool standstill as possible or at least deceleration can be brought about. These states may, for example, be those which are dependent on the work progress, for example on reaching a desired depth in the case of a screwing or drilling action or on reaching a desired tightening torque in a screwing action. However, rapid deceleration may also be necessary when an inadmissible operating state is recognized, for example excessive twisting of the power tool on account of a high moment of reaction if the tool is jammed A decelerating action may also serve for quickly braking a tool taking relatively long to slow down, for example an angle grinder, for example in order to put it down safely immediately after use.

In DE 2008 033 866 A1, it is proposed, for the purpose of limiting the output torque of a machine tool, to act upon the motor of the latter with a rotating field contradirectional to the instantaneous direction of rotation. By means of a brake operating mode initiated in this way, the output torque of the machine tool is to be regulated.

It has been shown that a feed of countercurrent to the motor can contribute to braking the power tool smoothly. However, especially in applications where high deceleration or high dynamics in regulating the braking action is desired, the feed of countercurrent may entail high loads upon components.

SUMMARY OF THE INVENTION

In view of this, it is a first object of the invention to disclose a power tool which provides a good braking effect.

It is a second object of the invention to disclose a power tool which provides a low load upon components and offers an improved durability.

It is a third object of the invention to disclose a power tool which allows for a low outlay in terms of components.

It is a forth object of the invention to disclose a method for controlling a power tool which provides for a good braking effect.

According to one aspect these and other objects of the invention are achieved by a power tool comprising:
 a motor;
 a drive driven by said motor;
 an energy supply device for providing electrical energy;
 a controller, the controller comprising a motor controller for activating the motor and further comprising an operating-state recognition module which is configured for detecting at least one operating-state variable and, as a function thereof, for outputting a brake signal;
 wherein said controller is configured to initiate, as a function of said brake signal, a braking procedure comprising at least one brake cycle, said brake cycle having a first time segment, wherein the motor is short-circuited, and at least a second time segment, wherein current is fed to the motor opposite to an original direction of rotation.

The object of the invention is thus achieved.

According to another aspect these and other objects are achieved by a method of decelerating a drive movement of a power tool having a motor, comprising the steps
 detecting at least one operating-state variable of a power tool;
 generating a brake signal as a function of the at least one operating-state variable;
 initiating a braking procedure as a function of a brake signal, the braking procedure having at least one brake cycle comprising a first time segment and a second time segment;
 wherein the motor is short-circuited during the first time segment; and
 wherein current is fed into the motor opposite to an original direction of rotation during the second time segment.

According to the invention, an advantageous linking of as short a braking time as possible and of a desired relieving of components can be brought about in that, during a brake cycle, deceleration takes place in one phase by means of short-circuit braking and in a second phase by means of countercurrent braking.

The first phase and the second phase, that is to say, essentially, the first time segment and the second time segment, can in this case be intentionally determined, taking into account the operating-state variable or further variables detectable during the operation of the power tool, or derived from these. Thus, an optimum can be achieved from the avoidance of excessive loads upon components of the power tool and from as high a deceleration as possible.

Although, during braking by means of a short circuit of, for example, exciting windings of the motor, only a relatively moderate deceleration, not as high as may be desired, can be brought about, this nevertheless takes place basically without any appreciable reaction upon the energy supply device, the controller or other components of the power tool. The excess kinetic energy is in this case reduced primarily in the form of heat losses.

By contrast, in deceleration by means of the feed of countercurrent, for example the feed of current to the exciting windings of the motor having a rotating field, the direction of rotation of the latter runs counter to the original initial rotating field. There is in this case as it were "active" deceleration which, on the one hand, may have high deceleration values, but, on the other hand, is usually accompanied by reactions upon the energy supply device or controller of the power tool. This is caused basically by mutual induction in the individual exciting windings and by the generator effect of the electric motor to be braked. In this case, in particular, voltage peaks and current surges may occur which could damage components of the power tool, and therefore these have to be dimensioned correspondingly.

Although the feedback of energy into the source, basically possible in the case of a feed of countercurrent, can be utilized in order to minimize the overall energy consumption of the power tool, what is to be feared is that in this case, particularly at the commencement of a brake cycle based solely on the feed of countercurrent, voltage peaks may occur which may have an adverse effect upon the service life of components of the power tool.

This applies especially to accumulator elements or compensating elements which are provided as a buffer between the energy supply device and the motor or controller. These may be, in particular, capacitors. Their dimensioning depends to an appreciable extent upon the magnitude of current surges which arise.

According to the invention, then, this first, critical phase of the brake cycle is stress-relieved in that, during the first time segment, deceleration takes place by means of short-circuit braking. The second time segment, the feed of countercurrent, then follows the first time segment. The reduction of energy in the system, particularly in the exciting windings, which has taken place up to then can contribute to lowering the resulting maximum values for current and voltage to an amount which avoids excessive loads upon components.

It will in this case be appreciated that the first time segment and the second time segment may be adopted or determined indirectly or directly. In particular, the first time segment and the second time segment may also be embodied, for example, by the angle of rotation of the motor or of a tool driven by the latter. This may in this case also be the angle of rotation of the rotating exciting field. The exciting field can, for example in the case of a plurality of pole pairs, rotate at a multiple of the mechanical rotational speed.

The intentional combination of deceleration by short circuit and of deceleration by the feed of countercurrent makes it possible to implement additional functionalities, without additional components having to be provided. These may be, for example, an emergency off function, end-of-travel cut-off and also a run-down brake. In spite of an extended range of functions, the component load can in this case be low, and therefore a desired service life of the power tool can be ensured.

As a result, for example, mechanical or electromechanical brakes or clutches can be replaced or else supplemented by extended brake functionality.

According to a development of the invention, the duration of a brake cycle is formed summarily from the first time segment and the second time segment, the second time segment comprising a maximum of 95% of the duration, preferably a maximum of 75% of the duration.

It may also be appreciated in this case that angle-of-rotation segments may also be adopted instead of the time segments.

The aim may basically be to make the first time segment, in which the motor is short-circuited, as short as possible, so as to still be able to transfer quickly to the second time segment in which the feed of countercurrent then takes place. The braking effect can thereby be maximized.

Thus, it may be preferable, further, that the first time segment comprises a maximum of 15% of the duration, preferably a maximum of 10% of the duration, further preferably a maximum of 5% of the duration of the brake cycle.

If, by contrast, the aim is to have as low a component load as possible, a markedly longer first time segment may be desirable. The first time segment may likewise advantageously be selected within a predetermined interval as a function of prevailing operating conditions.

According to a further aspect of the invention, the first time segment comprises at least 5% of the duration, preferably at least 25% of the duration.

It will be appreciated in this case that the first time segment and the second time segment or angle-of-rotation values equivalent to these can be supplemented at 100%, that is to say the total duration, of a brake cycle. It is likewise conceivable that the first time segment and the second time segment can be supplemented not exactly at 100% of the duration of the brake cycle, for example when necessary idling times or switching times are added.

As high fractions of the second time segment as possible in the duration of the brake cycle, on the one hand, cause high deceleration, but, on the other hand, lead to an increase in the load upon components. In specific functions, for example the emergency off function, which are not regularly used or called up, the second time segment selected may intentionally be large so that as effective braking as possible can be achieved.

To that extent, it may be preferable, further, that the second time segment comprises at least 85% of the duration, preferably at least 90% of the duration, further preferably at least 95% of the duration.

In this case, too, peak values for current and voltage can be avoided, but the high fraction of the feed of countercurrent in the overall braking action can cause very high deceleration which differs only insignificantly from possible deceleration in the case of the straightforward feed of countercurrent.

According to a further refinement of the invention, the motor is an electronically commutated electric motor, the duration of a brake cycle corresponding to the duration of a commutation interval.

Particularly in the case of electronically commutated electric motors, for example what are known as EC motors or BLDC motors, braking can be initiated and controlled by components which are present in any case. Thus, the direct or indirect position detection to be taken into account in the case of an electronically commutated electric motor makes it possible, for example, to determine angles of rotation or the direction of rotation. This may be advantageous especially when the motor is to be braked to a standstill. If standstill were to take place, for example, when the motor is being fed with countercurrent, a reverse movement would basically be imparted to the motor if the feed of countercurrent were to continue.

To that extent, it may be preferable, further, shortly before standstill or shortly before a target rotational speed or an angular speed to be achieved, to change from the feed of countercurrent to short-circuit braking in order to avoid "overshooting".

Electronically commutated electric motors can be acted upon, for example, with a sinusoidal signal profile, a block-shaped signal profile or else a pulse-width-modulated signal in order to generate the exciting rotating field. In the case of a block-shaped signal, there is, for example, provision for applying to an exciting winding a constant high signal during one commutation interval and a constant low signal or zero signal during a subsequent commutation interval. In the case of commutation with a pulse-width-modulated signal, for example, a sinusoidal profile can be approximated.

Particularly in the case of a controller with motor controller, which is designed for activating the motor by means of a pulse-width-modulated signal, the control of the braking action and the detection, necessary for this purpose, of the state of the motor can basically take place by means of already existing components without any appreciable extra outlay.

According to a further aspect of the invention, the energy supply device has an accumulator, in particular a nickel-cadmium accumulator, a lithium-ion accumulator, a lithium-polymer accumulator or a nickel-metal hydride accumulator.

Precisely where power tools are concerned, where the energy supply device also comprises an energy accumulator device, a braking action in which short-circuit braking and countercurrent braking are combined may contribute to reducing the wear of the energy accumulator device and maximizing its service life.

As mentioned at the outset, it may admittedly basically be advantageous to utilize the feedback occurring during deceleration by means of the feed of countercurrent in order to charge the energy accumulator. However, the accompanying current surges may overload or damage the energy accumulator or a charge and discharge control or cause it to age prematurely.

Since, according to the invention, such peaks are as it were "cut off" as a result of the short-circuit braking which precedes the feed of countercurrent, the energy supply device can be operated especially carefully.

According to a development of the invention, the at least one operating-state variable is derived indirectly or directly from a variable selected from the group which consists of the prevailing voltage or current consumption of the motor, the charge state or discharge state of the accumulator, drive speed, drive acceleration, drive speed, drive acceleration, drive torque, drive torque, angle of rotation, penetration or machining depth, exposure to oscillation or vibration, holding moment or momentary reaction of the power tool, switch-on state or operating mode of the power tool and operating temperature of the power tool.

The braking procedure can therefore be triggered in a state-dependent manner, in order to allow extended functionality of the power tool.

It is in this case conceivable to vary the duration of the first time segment or the duration of the second time segment, for example, as a function of the state of the accumulator, for example in order, in the case of a virtually fully charged accumulator, to limit currents accompanying the feedback. In this case, for example, a capacitance loss or service life loss of the accumulator can be avoided.

If the variation in the braking procedure takes place on the basis of the instantaneous state of the motor, a distinction can be made as to whether braking takes place from idling operation or from full-load operation of the motor, and the duration of the first time segment and of the second time segment can be adapted correspondingly.

If, by contrast, the initiation of the braking procedure takes place as a function of kinematic variables on the drive or on the drive, a braking action can be initiated as a function of the work progress. Thus, for example in the case of a screwdriver, a decrease in the drive speed or in the drive rotational speed can be adopted as an indicator that a screw head bears against the workpiece, consequently as an indicator of the end of a screwing action.

It will be appreciated that, precisely also in the case of a screwdriver, the work progress can be detected alternatively or additionally by measuring the drive torque, the drive torque or the current proportional to this. An abrupt rise in torque can in this case indicate the end of a screwing action.

It is likewise conceivable to provide a screwdriver with a stop which can be used to monitor the screwing action via separate sensors and to detect the end of the screwing action by the controller.

A depth stop of this type may likewise advantageously be used in the case of a drilling tool in order to indicate when specific machining depths are reached.

The detection of oscillation values or vibration values as possible signals for initiating the braking action may be used, for example, for recognizing component failure in which the overall rigidity of the power tool and, along with this, the detectable vibration level can usually change.

Furthermore, by monitoring the holding moment or moment of reaction of the power tool, a recoil or threat of a recoil of the power tool if the tool is jammed can be recognized and the introduction of torque of the motor be reduced or interrupted via the braking action.

The detection of the drive rotational speed or of the drive speed or of a variable characterizing these may be used, in combination with the detection of the switch-on state of the power tool, to ascertain what is known as an overrun and shorten it by means of a braking action. Power tools rotating at high speed with high kinetic energy or with high inertia in the drive often take a long time to slow down, even after being switched off, before the tool comes to a standstill. This may be the case, for example, with regard to angle grinders. An operator should therefore hold or guide the power tool in a controlled manner for some time even after immediate switch-off, wait for the tool standstill and put down the tool only thereafter, so that uncontrollable operating states or intrinsic movements can be avoided. By means of an adapted braking procedure, an overrun brake can be implemented and the time until the tool standstill can be markedly shortened.

Finally, the operating temperature of the power tool, for example of a gear or of the motor, can be monitored, so that high loads or overloads can be recognized and in order to initiate deceleration for the protection of the power tool. This may be advantageous particularly when the operation of the power tool lasts for a long time.

It will be appreciated that the braking procedure may be configured differently, depending on the variable currently used for triggering the braking action. Thus, for example in the case of safety-relevant actions, especially high deceleration may be desirable, even if this may sometimes be accompanied by increased load upon the motor, controller or energy supply device. If, by contrast, "normal" decelerations take place, the fractions of short-circuit braking or of the feed of countercurrent may be distributed in such a way as to give rise to as low a load upon components as possible.

According to a further refinement of the invention, the controller is designed for deriving the duration of the first time segment and consequently the duration of the second time segment from the duration of a previous commutation interval, in such a way that maximum values for current or voltage are not overshot.

Since deceleration is accompanied by only finite accelerations, in the case of customary nominal rotational speeds of the motor the duration of the current commutation interval can readily be inferred from the duration of the immediately preceding commutation interval or of a commutation interval preceding further on. This is due primarily to the inertia of the motor or of a tool coupled to the latter.

Furthermore, a suitable combination of the first time segment and of the second time segment during the braking procedure may allow virtually linear deceleration to be implementable. In this case, deceleration may be brought about up to the tool standstill or a new drive speed in the case of virtually constant (negative) acceleration. The avoidance of acceleration peaks can contribute to minimizing loads upon components.

On the basis of the detected operating-state variables, it is possible to determine or derive the maximum values for current or voltage which would arise, for example, during a braking action solely by the feed of countercurrent. These values can be compared with reference values which, on the one hand, may be permanently stored or, on the other hand, may likewise be derived from the detected operating-state variables. The duration of the first time segment, that is to say of short-circuit braking, and the duration of the second time segment, that is to say of the feed of countercurrent, can then be fixed so that the desired maximum values can be maintained.

According to a further aspect of the invention, the motor is designed as a permanently excited motor with electronic commutation.

This may, for example, be block commutation. It will be appreciated in this case that the profile of, for example, the exciting voltage does not in practice have to have ideally steep flanks, that is to say an infinitely rapid change in voltage level. The exciting voltage usually has, for example, a trapezoidal profile with slightly inclined flanks. Sine commutation may also be envisaged.

An efficient and highly dynamic motor which can be regulated with an uncomplicated component outlay and control outlay can be obtained when it is configured in this way.

It is likewise conceivable to permit a sine-like profile of the exciting voltage by means of pulse-width modulation. In this case, for example, the synchronism of the motor can be optimized.

Correspondingly, even during braking, voltage profiles may be designed to be block-shaped or trapezoidal or else have a pulse-width-modulated signal profile.

According to a further refinement of the invention, the motor has a permanently excited rotor which is assigned at least one position transmitter, preferably a Hall sensor, for detecting the position of the rotor.

This makes it possible, for example, to have position detection, direction-of-rotation detection and speed detection. These operating-state variables, too, may be adopted in order to initiate the braking procedure or to determine the duration of the first time segment and of the second time segment.

In this case, the position transmitter may comprise a plurality of Hall sensors, in particular three Hall sensors. The Hall sensors can in this case detect the position by means of a magnetic field of the permanently excited rotor or else by means of a separately provided sensor disc.

Other types of position detection can be envisaged, for example light barriers or the like. The rotational speed of the motor may alternatively or additionally be determined, for example, via a tachogenerator.

According to an alternative refinement of the invention, the controller is designed for the indirect detection of the position of the rotor via the mutual induction of an exciting winding of the motor.

In this way, position detection can take place without separate transmitters. In this case, for example, the mutual induction of an exciting winding not instantaneously excited by the controller is measured. This type of position determination is appropriate particularly when there is no need for highly accurate position detection. It must be remembered in this case that, particularly when the motor is being started, precautions must be taken in order to ensure the intended direction of rotation.

According to a further aspect of the invention, the motor has a plurality of exciting windings, the exciting windings being activatable in a star connection or delta connection.

Thus, for example, the start or warm-up of the electric motor can be assisted. Basically higher torques can be implemented in the case of the star connection and higher rotational speeds in the case of the delta connection.

As regards the delta connection, sensorless commutation, that is to say commutation in which no separate transmitters are taken into account for position detection, may take place by the addition of what is known as a virtual star point. A virtual star point may also be used in a star connection in which the star point is not coupled to position detection.

According to a further refinement of the invention, the controller is designed for giving rise during a brake cycle to a repeated change between the first time segment and the second time segment, preferably between the first time segment, the second time segment and a free-running phase.

Thus, the braking action can be regulated even more effectively. Advantageously, in this case, the activation of the exciting windings both for drive and for deceleration takes place on the basis of a pulse-width-modulated signal.

During the free-running phases, the motor neither receives current nor is short-circuited, so that essentially free rotation on account of the kinetic energy available can occur.

Thus, during the brake cycle, for example, short-circuit braking can alternate repeatedly with the feed of countercurrent and, if appropriate, with free-running phases, so that, overall, the first time segment and the second time segment are subdivided into a plurality of alternating phases during the brake cycle.

Along with this, for example, detection of the instantaneous values for current or voltage and, correspondingly, adaptation of the braking action can take place.

Thus, the brake cycle can be initiated by a short phase of short-circuit braking which is superseded by a phase of feed of countercurrent. As high deceleration as possible can thereby be brought about. If, however, it is found in this case that there is the threat of overshooting the maximum values for current or voltage, the feed of countercurrent can be interrupted anew or repeatedly by phases of short-circuit braking.

Consequently, overall, on-demand braking can take place which is adaptable to instantaneous states of the power tool and which takes into account the performance and service life of the electric tool, but also operator safety.

According to a further aspect of the invention, the controller is designed for causing pulse-width-modulated feed of current to or pulse-width-modulated short circuit of the motor during the first time segment or the second time segment.

Even better regulation of the braking action can thus take place within the time segments, in that the feed of countercurrent or the winding short circuit is switched to active only during specific subsegments of a time segment. If in this case the height of the modulation frequency is suitably selected, individual modulation intervals for the components involved are not "visible" or resolvable. The use of such "inertial effects" may contribute further to reducing the loads upon components, in particular loads due to voltage peaks, to a desired amount.

The method according to the invention is developed in that the at least one operating-state variable is derived indirectly or directly from a variable selected from the group which consists of the prevailing voltage or current consumption of the motor, the charge or discharge state of the accumulator, drive speed, drive acceleration, output drive speed, drive acceleration, drive torque, output drive torque, angle of rotation, penetration or machining depth, exposure to oscillation or vibration, holding moment or moment of reaction of the power tool, switch-on state or operating mode of the power tool and operating temperature of the power tool.

According to a further aspect of the method, the step of determining the duration of the first time segment and consequently the duration of the second time segment is provided in such a way that maximum values for current or voltage are not overshot, preferably in this case the step of detecting the duration of a previous commutation interval as reference duration being provided.

It will be appreciated that the features of the invention which are mentioned above and are yet to be explained below can be used not only in the combination specified in each case, but also in other combinations or alone, without departing from the scope of the present invention.

BRIEF DESCRIPTION OF THE DRAWINGS

Further features and advantages of the invention may be gathered from the following description of a preferred exemplary embodiment, with reference to the drawings in which.

DETAILED DESCRIPTION OF THE PREFERRED EMBODIMENTS

Figure 1:
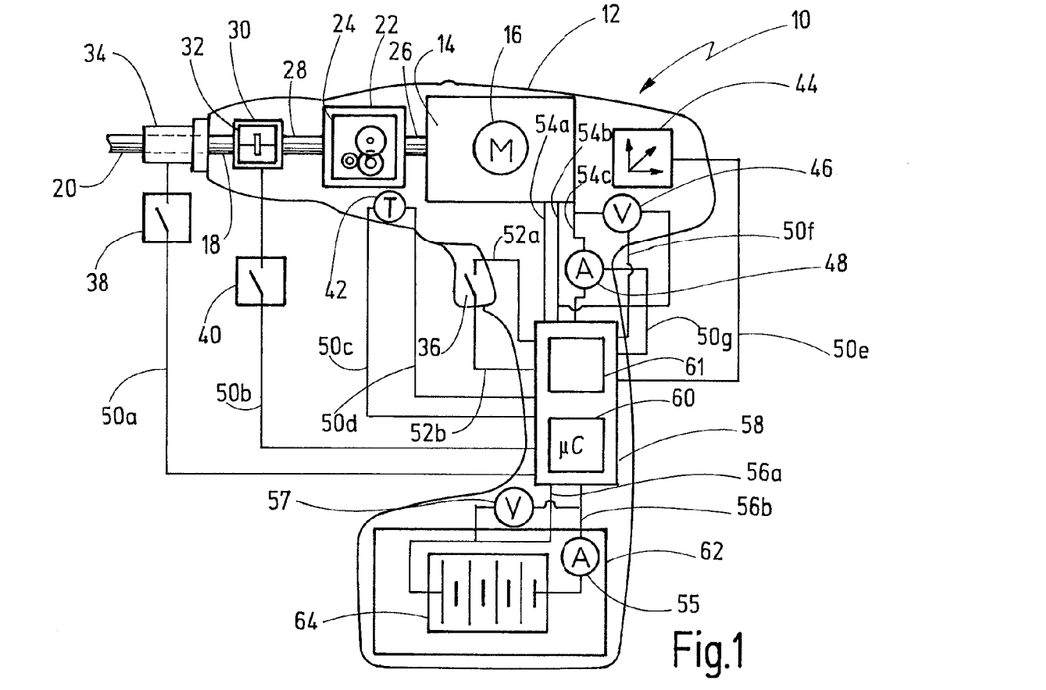
FIG. 1 shows a diagrammatic illustration of a power tool according to the invention.

A power tool according to the invention is illustrated diagrammatically in simplified form and designated as a whole by 10 in FIG. 1.

The power tool 10 has a housing 12 which receives a drive 14 with a motor 16. The drive 14 is coupled to a tool 20 (not illustrated in full) via a drive 18. Furthermore, a transmission device 22, in the present case comprising a gear 24, a motor shaft 26, a gear shaft 28 and an engagement device 30, in the present case comprising a clutch 32, are interposed between the drive 14 and the drive 18.

The power tool 10 is illustrated in FIG. 1, by way of example, as a screwing tool or as a drilling tool. It will be appreciated, however, that it could also be a tool for grinding, polishing, sawing, cutting, hammering or the like which can be provided with the same or similar components.

It should be noted, furthermore, that the illustration according to FIG. 1 illustrates a possible maximum configuration of the power tool 10, on the basis of which the invention is explained. In practical use, depending on application and conditions of use, the power tool 10 may regularly have a smaller and less complicated number of components which, according to the invention, cooperate in order to decelerate the power tool 10.

An operator can grasp the power tool 10 in a grip region and activate or deactivate it via an actuating switch 36.

Particularly when the power tool 10 is used as a screwing tool or drilling tool, depth limitation 34 may be provided which is designed to limit a penetration depth or screw-in depth. The depth limitation 34 may be coupled, for this purpose, to a signal generator 38 which can supply a signal to a controller 58. The depth limitation 34 may in this case trigger, for example, via a predetermined stop or else have elements for torque detection and can output a signal as a function of the screwing torque or drilling torque. Control of work progress by torque monitoring is carried out especially when the power tool 10 is used as a screwing tool. In this case, usually, detection of the screw-in torque takes place in order to brake the drive or uncouple it from the drive 18 at the end of the screwing action in response to an expected rise in torque.

The more quickly and the more accurately the drive 14 can in this case be braked or else uncoupled from the drive 18, the more quickly the screw action can proceed overall, at the same time ensuring the necessary screwing quality. It is conceivable to implement the uncoupling of the drive 14 from the drive 18 by means of the engagement device 30, in particular, for example, a shift clutch 32. If, however, such an outlay in structural terms is to be avoided, the aim must be to brake the drive 14 in the shortest possible time after a triggering torque is reached during the screwing-in action, so that overtwisting and therefore possible preliminary damage to the screw connection can be avoided.

As already stated above, FIG. 1 illustrates a possible maximum configuration of the power tool 10. In this case, the controller 58 is coupled to a plurality of signal generators 38, 40, 42, 44, 46, 48. While the signal generator 38 is designed to supply an operating-state variable, determined at the depth limitation 34, to the controller 58 via a signal line 50a, the signal generator 40 is coupled to the engagement device 30. The signal generator 40 is designed to detect an operating state of the engagement device 30 or of the clutch 32 and to transmit it to the controller 58 via signal line 50b. This may be, for example, a signal which characterizes an open state, a closed state or else a slipping state of the clutch 32.

Especially when the engagement device 30 has a slipping clutch, the signal generator 40 can be used in order to detect the slipping state and activate the controller 58 accordingly, in order to brake the drive 14 quickly so that component damage in the engagement device 30 can be avoided.

A further signal generator 42 is indicated as a temperature sensor and is accommodated on or in the housing 12 of the power tool 10. In the present case, the signal generator 42 is arranged in the vicinity of the transmission device 22. The transmission device 22, primarily the gear 24, may, for example under continuous load, experience considerable heating which may possibly lead to increased component wear. A similar thing may occur with regard to the engagement device 30, the motor 16, the controller 58 or else an energy supply device 62 (see below). The signal generator 42 may therefore be designed to recognize when a maximum temperature is overshot and to transmit this to the controller 58 via signal lines 50c, 50d, so that a deceleration of the motor 16 can be initiated. In this case, too, excessive wear or damage to the power tool 10 can be avoided.

In the present case, the signal generator 44 is indicated as an acceleration sensor and is coupled to the controller 58 via a signal line 50e. The signal generator 44 can detect vibration values or oscillation values which characterize the operating state of the power tool 10. The vibration level which can be perceived by the operator can consequently be determined.

Interposed between the controller 58 and the drive 14 or motor 16 are control lines 54a, 54b, 54c which serve for exciting the motor 16. For example, the control line 54c has a signal generator 48 which is indicated, for example, as an ammeter. Likewise by way of example, a signal generator 46 in the form of a voltmeter is interposed between the control lines 54b and 54c. The signal generator 48 is connected via a signal line 50g and the signal generator 46 via a signal line 50f to the controller 58. The signal generators 46, 48 are designed for detecting instantaneous values and maximum values for current and voltage which can be employed for controlling the deceleration of the motor 16.

Furthermore, the power tool 10 has an energy supply device 62 which is coupled to the controller 58 via supply lines 56a, 56b. Furthermore, a signal generator 55 in the form of an ammeter and a signal generator 57 in the form of a voltmeter are coupled to the supply lines 56a, 56b so that current and voltage can be detected.

In addition, the actuating switch 36 is also connected to the controller 58 via switching lines 52a, 52b.

The controller 58 has a motor controller 60 and an operating-state recognition module 61. The module control 60 serves for activating the motor 16 for generating a drive movement and, as required, for controlled deceleration of the motor 16, as explained in connection with FIG. 2. For this purpose, the operating-state recognition module 61 is designed, in particular, for recording and evaluating the signals detected by the signal generators 38, 40, 42, 44, 46, 48, in order as a function of these, if required, to initiate a braking procedure in which the motor controller 60 acts upon the motor 16 in a controlled way for the deceleration of the latter.

For this purpose, the operating-state recognition module 61 may, if appropriate, also have access to the signals which are detected by the signal generators 55, 57 and characterize the state of the energy supply device 62.

The energy supply device 62 has an accumulator 64 which serves for the provision of electrical energy. This may be designed, for example, as a nickel-cadmium accumulator, lithium-ion accumulator or lithium-polymer accumulator. Furthermore, a charge and discharge control may be provided (not illustrated) which can monitor and control the charging actions and discharging actions and also the operating state of the accumulator 64. Such tasks may alternatively be dealt with likewise by the controller 58.

It would be appreciated that the energy supply device 62 may likewise be coupled to external lines, instead of to the accumulator 64, in order to provide electrical energy from an alternating current network, preferably using a rectifier.

Figure 2:
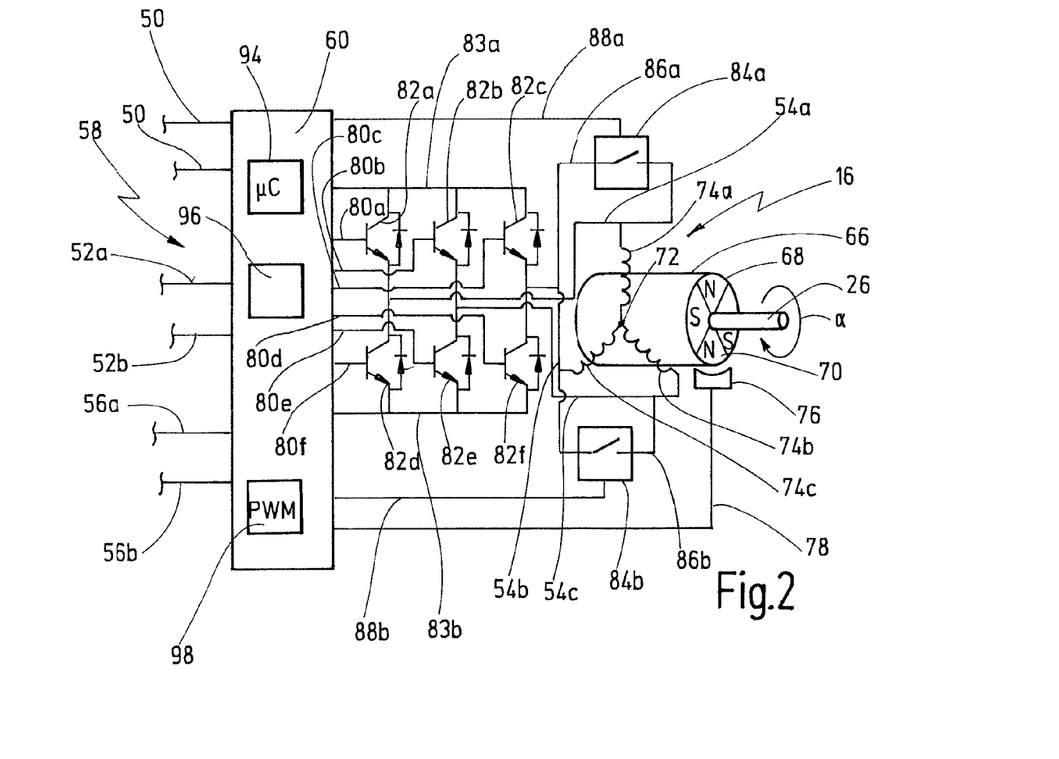
FIG. 2 shows a simplified diagrammatic illustration of a controller coupled to a motor.

FIG. 2 illustrates a detail of the controller 58 in the form of a greatly simplified circuit diagram. In this case, the motor controller 60 is designed for generating a rotating field in order to drive a rotor 66 of the motor 16. The rotor 66 may be designed as a permanently excited rotor with a plurality of pole pairs 68, 70. In the present case, two pole pairs 68, 70 are indicated. A larger number of these may readily be envisaged, in particular four pole pairs on the rotor 66 are preferred. Furthermore, the rotor 66 is coupled to the motor shaft 26. The rotational movement occurring when the rotor 66 is driven leads to a rotation $\alpha$, as indicated by a curved arrow.

Furthermore, to generate the rotating fields, a plurality of exciting windings 74a, 74b, 74c are provided which in the present case are linked via a star point 72. The exciting windings 74a, 74b, 74c may readily also be wired up as a delta connection in order to generate the rotating field driving the rotor 66.

The exciting windings 74a, 74b, 74c can be activated by the control lines 54a, 54b, 54c, cf. also FIG. 1. Where an electronically commutatable electric motor 16 is concerned, it is necessary to bring about the rotating field via the motor controller 60. Such activation of the exciting windings 74a, 74b, 74c makes it possible, inter alia, to dispense with brushes for contacting, so that the motor 16 can be configured, overall, so as to be low-maintenance or virtually free of maintenance.

To detect the position of the rotor 66, a position transmitter 76 is provided which is coupled to the motor controller 60. The position transmitter 76 may be designed, for example, as a Hall sensor, in particular may have a plurality of Hall sensors, for example three Hall sensors. The position transmitter 76 is designed for detecting the magnetic field of the pole pairs 68, 70 of the rotor 66 or else of a sensor disc (not illustrated) provided separately on the motor shaft 26, for the purpose of position determination. A position line 78 is provided for contacting the position transmitter 76 with the motor controller 60.

To generate the rotating field, the motor controller 60 has a plurality of switching members 82a, 82b, 82c, 82d, 82e, 82f which can be activated via switching lines 80a, 80b, 80c, 80d, 80e, 80f. As a function of their interconnection, the switching members 82 can selectively act, for example, with a high signal, with a low signal or else with a zero signal upon individual exciting windings 74a, 74b, 74c in order to form the alternating field. The signal may basically have a block-shaped, sinusoidal or pulse-width-modulated profile. The switching members 82 may be, in particular, integrated or discrete power transistors. The outputs of the switching members 82 are connected correspondingly to the control lines 54a, 54b, 54c coupled to the exciting windings 74a, 74b, 74c.

Supply lines which supply the switching members 82 and consequently also the motor 16 with electrical energy are indicated by 83a and 83b. The supply lines 83a, 83b are coupled indirectly or directly to the supply lines 56a, 56b via the controller 58.

Furthermore, FIG. 2 indicates in simplified form short-circuit switches 84a, 84b which are designed for short-circuiting the exciting windings 74a, 74b, 74c with one another. The short-circuit switch 84a is in this case couplable via the short-circuit line 86a to the exciting winding 74a and to the exciting winding 74c in order to short-circuit these. The short-circuit switch 84b is designed for short-circuiting the exciting winding 74c with the exciting winding 74b via the short-circuit line 86b. Further short-circuit switches may similarly be provided, for example in order to short-circuit the exciting winding 74a with the exciting winding 74b. The short-circuit switches 84a, 84b are activatable via short-circuit control lines 88a, 88b which are coupled to the motor controller 60.

It would be appreciated in this case that the short-circuit switches 84a, 84b and the short-circuit lines 86a, 86b are illustrated as separate elements merely for clarity. The functionality of the short-circuit switches 84a, 84b may likewise be implemented by the motor controller 60, for example using the switching lines 80a, 80b, 80c, 80d, 80e, 80f and the switching members 82a, 82b, 82c, 82d, 82e, 82f.

It can likewise be comprehended that, if the exciting windings 74a, 74b, 74c are wired up in a delta connection, the short-circuit switches 84a, 84b can be designed and contacted in such a way that they can selectively short-circuit individual or a plurality of the delta-connected exciting windings 74 so that energy stored in the exciting windings 74 can be reduced.

The motor controller 60 is assigned on the input side a plurality of signal lines 50, the switching lines 52a, 52b coupled to the actuating switch 36 and the supply lines 56a, 56b connected to the energy supply device 62.

Furthermore, to implement the activation and deceleration of the motor 16, the motor controller 60 has a processor or a logic unit 94, a pulse-width modulation control 98 and a clock generator 96. It would be appreciated in this case that the said components may readily be designed to be integrated completely or else discretely in the motor controller 60.

According to the invention, the power tool 10 is designed for initiating, as a function of detected operating states, a deceleration of the motor 16 which can bring about both effective deceleration which is as short as possible and, on the other hand, also a reduced load upon components so as to ensure an increased service life.

Figure 3:
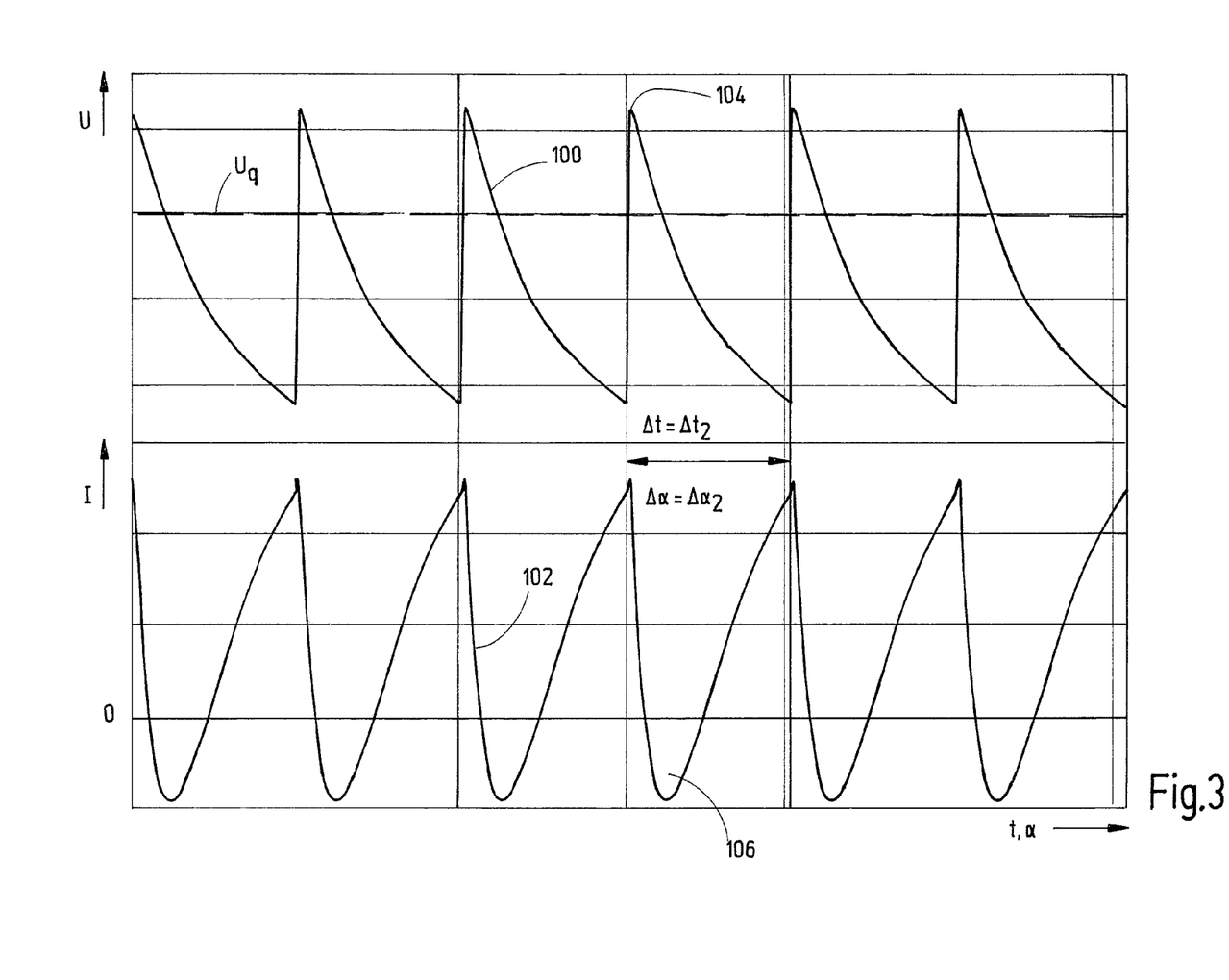
FIG. 3 shows the profile of voltage and current against time or against the angle of rotation in the supply line to the motor during a braking action solely by the feed of countercurrent.
Figure 4:
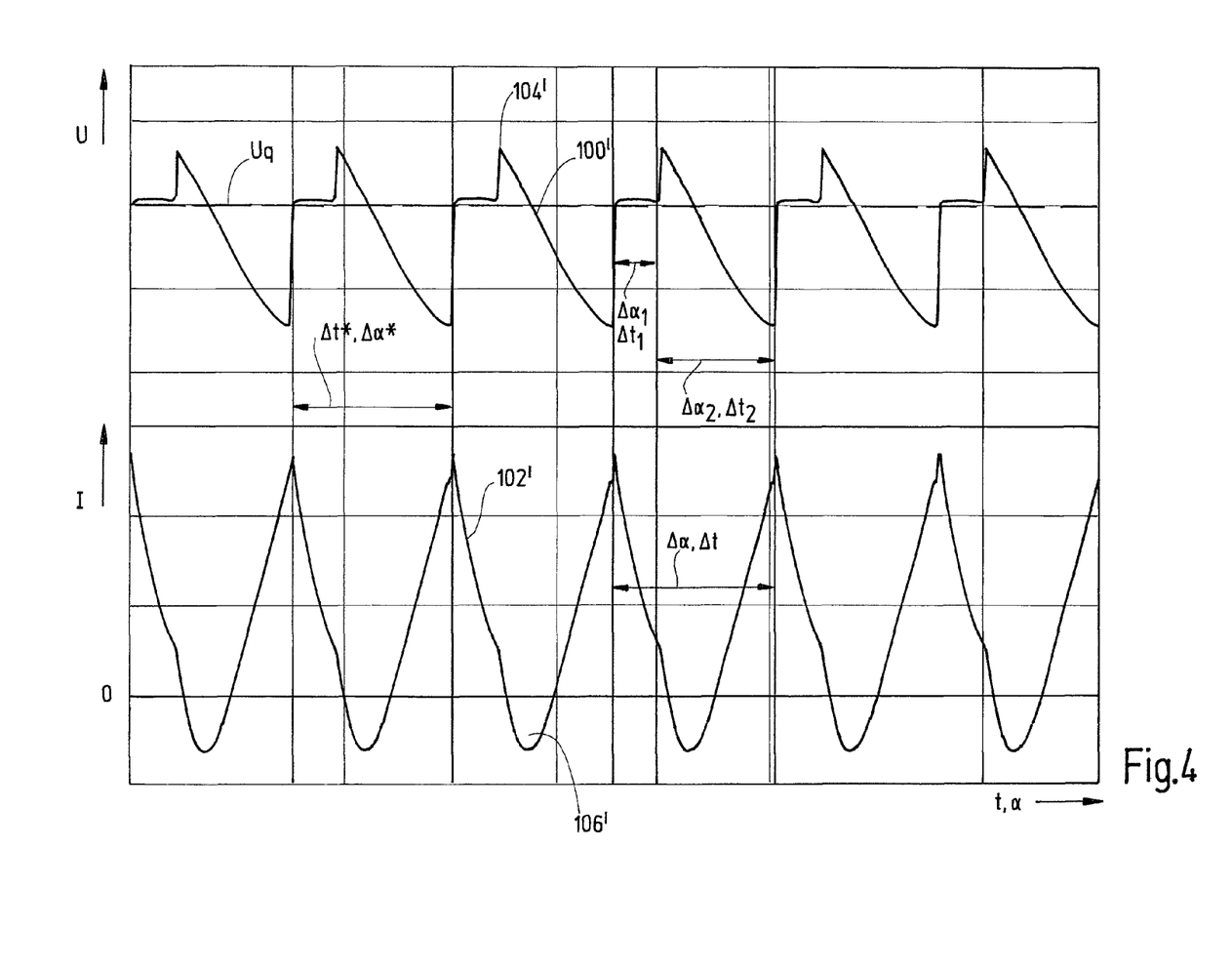
FIG. 4 shows the profile of voltage and current against time or against the angle of rotation in the supply line to the motor during a braking action with a first time segment of approximately 25% and a second time segment of approximately 75% of the duration of a brake cycle.
Figure 5:
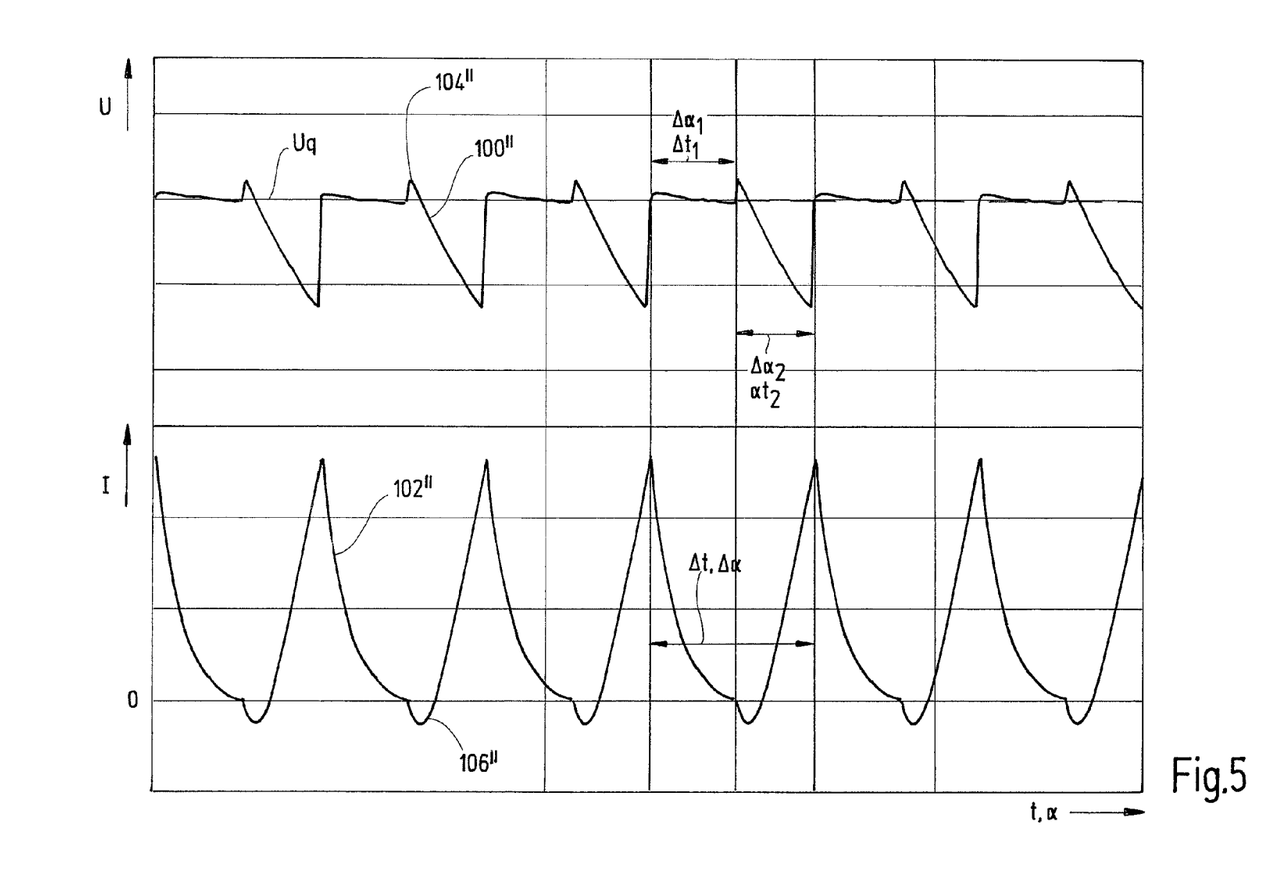
FIG. 5 shows the profile of voltage and current against time or against the angle of rotation in the supply line to the motor during a braking action with a first time segment of approximately 50% and a second time segment of approximately 50% of the duration of a brake cycle.

The braking procedure according to the invention is described in more detail by means of FIGS. 3 to 5.

FIGS. 3 to 5 illustrate in each case six commutation intervals during which deceleration takes place. The six commutation intervals may correspond, for example, to one electrical revolution which, in the case of a plurality of pole pairs, corresponds to a corresponding fraction of a mechanical revolution of the rotor 66. For example, the six commutations in the case of a total of four pole pairs on the rotor 66 can describe one quarter of a mechanical revolution of the rotor 66.

The scales in FIGS. 3 to 5 are basically identical, so that the absolute values of the individual profiles in the various figures can be compared with one another. In each case the time t and the angle of rotation α are plotted on the abscissa. The ordinate has the associated instantaneous values of the voltage U and of the current I. Furthermore, for clarity, in the current profile the zero line is emboldened, while, in the voltage profile, the source voltage or supply voltage $U_q$ is indicated by emboldened dashes as a reference. Voltage values and current values can in this case be detected, for example, of the supply lines 83a, 83b. The duration of the commutation interval, that is to say, for example, of a brake cycle, is designated in each case by Δt, the duration of the first time segment, that is to say of short-circuit braking, by $\Delta t_1$ and the duration of the second time segment, that is to say of the feed of countercurrent, by $\Delta t_2$.

FIG. 3 indicates a voltage profile 100 and a current profile 102 over six brake cycles, that is to say six commutation intervals, which can arise during a braking action based on straightforward feed of countercurrent. Since, in general, deceleration cannot be infinitely great on account of the inertias of the rotor 66 or of the tool 20 coupled to the motor 16, no deceleration can be seen in the illustration of FIGS. 3 to 5 between individual intervals illustrated. This is due primarily to the high time resolution which shows only an extract from six commutation intervals. To that extent, in the selected resolution, the time t can be equated approximately to the angle of rotation α.

In other words, the duration Δt of the individual commutation intervals in FIG. 3, FIG. 4 and FIG. 5 is in each case largely identical, since deceleration becomes noticeable only in the case of other time resolutions in the illustration.

Furthermore, FIGS. 3 to 5 therefore also indicate, in addition to the time t or the time intervals Δt, $\Delta t_1$, $\Delta t_2$, the angle of rotation α together with the angle-of-rotation intervals Δα, $\Delta \alpha_1$, $\Delta \alpha_2$. Within the framework of the resolution under consideration, the time particulars or the angle-of-rotation particulars may be considered essentially as being equivalent to one another.

As already indicated above, during deceleration by means of the feed of countercurrent, in each case a marked voltage rise in the supply line for the supply voltage or source voltage $U_q$ are the commencement of commutation. This is emphasized in the illustrated voltage profile 100 by a voltage peak 104.

If the voltage profile 100 lies above the source voltage $U_q$, the motor 16 acts as a generator. The current profile 102 makes this clear. Due to self-induction in the exciting windings 74, the current profile 102 is in this case basically displaced with respect to the voltage profile 100, the current lagging behind the voltage. The voltage peak 104 is reflected in a briefly negative current profile 102, during which a feedback of energy into the source takes place. The region of current feedback is in this case indicated by 106. Both the voltage peak 104 and the current feedback 106 must therefore be taken into account in dimensioning the parts and components involved. In the region in which the voltage profile 100 lies below the source voltage $U_q$ and a positive current flows, the motor 16 no longer acts as a generator and is actively decelerated by the prevailing contradirectional field.

It becomes clear from looking at FIG. 3 together with FIG. 4 that, during a brake cycle in which a first time segment $\Delta t_1$ is provided in which the exciting windings 74 are initially short-circuited, a marked relieving of components can occur which may contribute to increasing the service life of the components involved.

In FIG. 4, the brake cycle is divided into the first time segment $\Delta t_1$, which, for example, comprises 25% of the overall duration Δt of the brake cycle, and a second time segment $\Delta t_2$, which comprises, for example, 75% of the overall duration Δt of the brake cycle. In a comparison of the voltage peak 104 according to FIG. 3 and a voltage peak 104', it is clear that a marked reduction has been brought about. The short circuit of the exciting windings 74 during the first time segment $\Delta t_1$ gives rise first to a "decoupling" of the energy stored in the exciting windings 74 from the motor controller 60. This can be reduced in the form of lost power, primarily as thermal energy. Consequently, when the second time segment $\Delta t_2$ is initiated, in which current is fed to the exciting windings opposite to their original direction of rotation, less energy remains in the exciting windings, so that the voltage rise, that is to say the voltage peak 104', appears less pronounced. Accordingly, that region of the current profile 102' in which the current I may assume values <0, that is to say there is a case of current feedback 106', is also smaller than during a braking action which is based solely on the feed of countercurrent.

Furthermore, FIG. 4 indicates by Δt* or Δα* a previous commutation interval, on the basis of which the division of the current commutation interval Δt, Δα into the first segment $\Delta t_1$, $\Delta \alpha_1$ and the second segment $\Delta t_2$, $\Delta \alpha_2$ can take place. It becomes clear in this case that the previous segment Δt*, Δα* does not have to lie directly in front of the segment Δt, Δα considered, but, instead, may also precede this further on. Since the individual commutation intervals illustrated do not differ noticeably from one another even during deceleration, a consideration of the previous commutation interval Δt*, Δα* allows sufficient accuracy in determining the first segment $\Delta t_1$, $\Delta \alpha_1$ and the second segment $\Delta t_2$, $\Delta \alpha_2$. Commutation intervals lying between them may be necessary, for example, so that sufficient time can be made available for calculation or logic operations pending in this case.

To bring about as high a deceleration as possible, the aim is to make the first time segment as short as possible and the second time segment as long as possible. It is therefore basically preferable to limit the first time segment to a maximum of 15%, preferably 10%, further preferably 5% of the duration of the commutation interval Δt. The correspondingly higher maximum values occurring in this case for the voltage U and the current I may place limits upon this endeavour. However, it is conceivable, for example in a critical operating state in which operator safety or as rapid a standstill of the motor 16 as possible is of primary importance, to provide a corresponding division of the commutation interval. During customary operating states, for example reaching a desired torque during a screwing action, the first time segment $\Delta t_1$ could be correspondingly longer so as to minimize load upon components.

FIG. 5 basically illustrates a similar profile of voltage U and current I to that in FIG. 4, but in this case both the first time segment $\Delta t_1$ and the second time segment $\Delta t_2$ have in each case about 50% of the duration of the commutation interval Δt. It is immediately clear that the voltage peak 104" is markedly smaller than in FIGS. 3 and 4. Correspondingly, the current profile 102" also has a smaller negative segment, so that further-reduced current feedback 106" can occur. Overall, a braking procedure with brake cycles according to FIG. 5 can lead to reduced component load in the controller 58 and in the energy supply device 62. It will nevertheless be appreciated that this is accompanied by a less pronounced deceleration of the motor 16 of the power tool 10.

Figure 6:
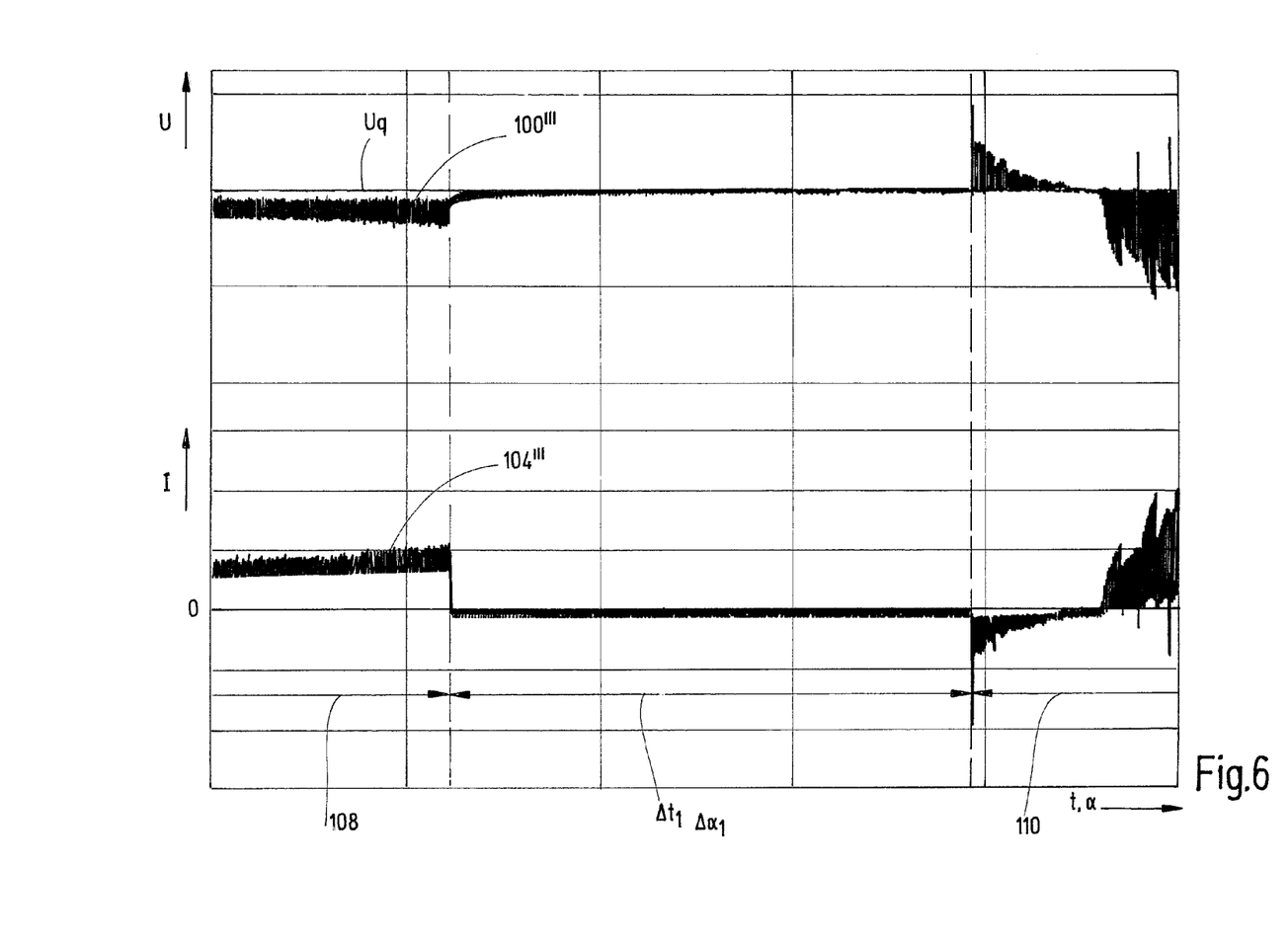
FIG. 6 shows the profile of voltage and current against time or against the angle of rotation in the supply line to the motor during a braking action solely by means of short-circuit braking.

FIG. 6 illustrates a braking action which is based solely on short-circuit braking. The profiles of voltage U 100''' and current I 102''' show in this case the transition in time from normal operation 108 to braking operation, in which a short-circuit of the exciting windings 74 takes place during the brake cycle, and, finally, to regulated operation 110 in which a voltage peak initially occurs. The time segment of short-circuit braking is designated by $\Delta t_1$. It becomes clear that, during short-circuit braking, the exciting windings 74 are decoupled from the controller 58 with the motor controller 60 in such a way that no appreciable reactions can occur.

Figure 7:
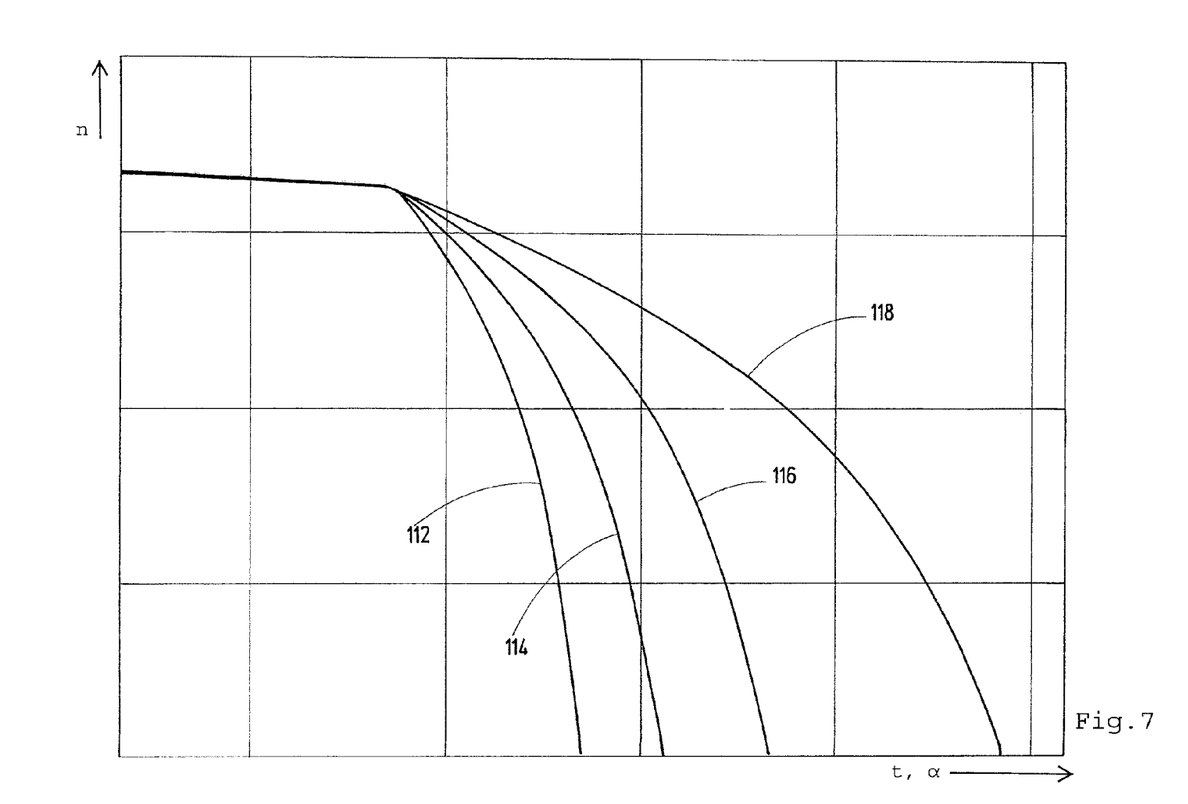
FIG. 7 shows the profile of the rotational speed of the motor against time or against the angle of rotation during various braking actions with brake cycles having different fractions of short-circuit braking and of feed of countercurrent.

In summary, FIG. 7 illustrates the influence of various short-circuit fractions and countercurrent feed fractions in the brake cycle during the braking action upon the overall duration of the braking action or the deceleration to be achieved in this case.

In this case, rotational speed n is plotted against the time t or the angle of rotation α. As expected, a profile, designated by 112, in which deceleration is based on straightforward feed of countercurrent, affords the most marked deceleration values or requires the shortest time to standstill.

Conversely, a braking action based solely on short-circuit braking, the profile of which is indicated by 118 in FIG. 7, requires the longest time for deceleration.

The intermediate profiles 114 and 116 correspond, for example according to FIG. 4 and FIG. 5, to braking actions in which there is a certain short-circuit fraction. The profile 114 shows a braking action in which there is a short-circuit fraction $\Delta t_1$ of about 25% and a countercurrent feed fraction $\Delta t_2$ of about 75%. By contrast, the profile 116 illustrates a configuration, for example, according to FIG. 5, in which there are a short-circuit fraction $\Delta t_1$ of approximately 50% and, correspondingly, a countercurrent feed fraction $\Delta t_2$ of likewise about 50% of the duration Δt of a brake cycle.

The shorter the selected short-circuit fraction is, the higher the achievable deceleration is, the time required to standstill likewise falling. Conversely, the load upon components can be reduced, the shorter the selected countercurrent feed fraction is.

Within the scope of the invention, it has been possible to disclose a power tool comprising a motor, a controller which is designed for initiating, as a function of a brake signal, a deceleration of the power tool wherein an optimal compromise between component load and long service life and also efficiency and high attainable deceleration can be achieved.

What is claimed is:

1. A power tool comprising:
an electronically commutated electric motor having a certain commutation interval, said motor comprising a plurality of exciting windings, said exciting windings being configured in a star connection or in a delta connection;
a drive driven by said motor;
an energy supply device for providing electrical energy;
a controller, the controller comprising a motor controller for activating the motor and further comprising an operating-state recognition module which is configured for detecting at least one operating-state variable and, as a function thereof, for outputting a brake signal;
wherein said controller is configured to initiate, as a function of said brake signal, a braking procedure comprising at least one brake cycle having a certain duration, said brake cycle having a first time segment, wherein the motor is short-circuited, and at least a second time segment, wherein current is fed to the motor opposite to an original direction of rotation;
wherein said duration of said brake cycle corresponds to said commutation interval.

2. The power tool of claim 1, wherein said controller during a brake cycle is configured to initiate a repeated cycling between said first time segment and said second time segment.

3. The power tool of claim 1, wherein said controller during a brake cycle is configured to initiate a repeated cycling between said first time segment, said second time segment and a free-running phase.

4. A power tool comprising:
a motor;
a drive driven by said motor;
an energy supply device for providing electrical energy;
a controller, the controller comprising a motor controller for activating the motor and further comprising an operating-state recognition module which is configured for detecting at least one operating-state variable and, as a function thereof, for outputting a brake signal;
wherein said controller is configured to initiate, as a function of said brake signal, a braking procedure comprising at least one brake cycle, said brake cycle having a first time segment, wherein the motor is short-circuited, and at least a second time segment, wherein current is fed to the motor opposite to an original direction of rotation.

5. The power tool of claim 4, wherein a duration of a brake cycle is formed in total from the sum of the first time segment and the second time segment, said second time segment comprising a maximum of 95% of said duration, preferably a maximum of 75% of said duration.

6. The power tool of claim 4, wherein said first time segment comprises at least 5% of the duration, preferably at least 25% of the duration.

7. The power tool of claim 4, wherein said motor is an electronically commutated electric motor.

8. The power tool of claim 4, wherein said motor has a certain commutation interval, the duration of a brake cycle corresponding to said duration.

9. The power tool of claim 4, wherein the energy supply comprises an accumulator.

10. The power tool of claim 4, wherein the at least one operating-state variable is derived from a variable selected from the group consisting of a prevailing voltage of the motor, a current consumption of the motor, a charge state of the accumulator, a discharge state of the accumulator, a drive speed, a drive acceleration, an output drive speed, a drive acceleration, a drive torque, an output drive torque, an angle of rotation, a penetration depth, a machining depth, an exposure to oscillation, an exposure to vibration, a holding moment of the power tool, a moment of reaction of the power tool, a switch-on state, an operating mode of the power tool, and operating temperature of the power tool.

11. The power tool of claim 4, wherein said controller is configured for deriving the duration of said first time segment and consequently said duration of said second time segment from a duration of a previous commutation interval, so that maximum values for current or voltage are limited.

12. The power tool of claim 4, wherein said motor is configured as a permanently excited motor with electronic commutation.

13. The power tool of claim 12, wherein said motor has a permanently excited rotor which is linked to least one position transmitter for detecting an angular position of said rotor.

14. The power tool of claim 12, wherein said controller is configured for indirectly detecting an angular position of said rotor via a mutual induction of an exciting winding of said motor.

15. The power tool of claim 4, wherein said motor comprises a plurality of exciting windings, said exciting windings being configured in a star connection or in a delta connection.

16. The power tool of claim 4, wherein said controller during a brake cycle is configured to initiate a repeated cycling between said first time segment and said second time segment.

17. The power tool of claim 4, wherein said controller during a brake cycle is configured to initiate a repeated cycling between said first time segment, said second time segment and a free-running phase.

18. The power tool of claim 4, wherein said controller is configured for causing a pulse-width-modulated feeding of current during at least one of said first and second time segments.

19. The power tool of claim 4, wherein said controller is configured for causing a pulse-width-modulated short circuiting of said motor during at least one of said first and second time segments.

20. A method of decelerating a drive movement of a power tool having a motor, comprising the following steps:
  detecting at least one operating-state variable of a power tool;
  generating a brake signal as a function of the at least one operating-state variable;
  initiating a braking procedure as a function of a brake signal, the braking procedure having at least one brake cycle comprising a first time segment and a second time segment;
  wherein the motor is short-circuited during the first time segment; and
  wherein current is fed into the motor opposite to an original direction of rotation during the second time segment.

* * * * *